US012630139B2

(12) United States Patent
Weh et al.

(10) Patent No.: US 12,630,139 B2
(45) Date of Patent: May 19, 2026

(54) HYDRAULIC BLOCK FOR A HYDRAULIC VEHICLE POWER BRAKE SYSTEM

(71) Applicant: Robert Bosch GmbH, Stuttgart (DE)

(72) Inventors: Andreas Weh, Sulzberg (DE); Matthias Mayr, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 385 days.

(21) Appl. No.: 18/253,438

(22) PCT Filed: Nov. 26, 2021

(86) PCT No.: PCT/EP2021/083077
§ 371 (c)(1),
(2) Date: May 18, 2023

(87) PCT Pub. No.: WO2022/122405
PCT Pub. Date: Jun. 16, 2022

(65) Prior Publication Data
US 2024/0010180 A1 Jan. 11, 2024

(30) Foreign Application Priority Data
Dec. 9, 2020 (DE) ..................... 10 2020 215 519.4

(51) Int. Cl.
*B60T 17/02* (2006.01)
*B60T 8/36* (2006.01)

(52) U.S. Cl.
CPC .............. *B60T 17/02* (2013.01); *B60T 8/368* (2013.01)

(58) Field of Classification Search
CPC ................................ B60T 17/02; B60T 8/368

USPC ....................................... 303/10, 116.4, 119.3
See application file for complete search history.

(56) References Cited

U.S. PATENT DOCUMENTS

| | | | | |
|---|---|---|---|---|
| 10,941,764 B2 * | 3/2021 | Ohm | .......................... | F16H 25/20 |
| 2018/0029575 A1 * | 2/2018 | Malwitz | ................... | F16D 65/16 |
| 2018/0345934 A1 * | 12/2018 | Weh | ....................... | B60T 8/4018 |
| 2020/0047731 A1 * | 2/2020 | Reuter | ................... | B60T 13/146 |
| 2022/0163023 A1 * | 5/2022 | Weh | ......................... | F04B 53/16 |

FOREIGN PATENT DOCUMENTS

| | | | | |
|---|---|---|---|---|
| CN | 104057936 A | 9/2014 | | |
| DE | 102014225595 A1 | 6/2016 | | |
| DE | 102017214593 A1 | 2/2019 | | |
| DE | 102019206754 A1 | 11/2020 | | |
| DE | 102020207358 A1 * | 12/2021 | .............. | B60T 11/16 |

(Continued)

OTHER PUBLICATIONS

International Search Report for PCT/EP2021/083077, Issued Feb. 22, 2022.

*Primary Examiner* — Christopher P Schwartz
(74) *Attorney, Agent, or Firm* — NORTON ROSE FULBRIGHT US LLP

(57) ABSTRACT

A hydraulic block for a hydraulic unit for generating brake pressure and regulating brake pressure in a hydraulic vehicle power brake system. The hydraulic block includes a projection that extends the power cylinder bore which passes transversely through the hydraulic block on a large side of the hydraulic block and a projection that extends an anti-rotation guide of a power piston of a power brake pressure generator on an opposite large side of the hydraulic block.

8 Claims, 3 Drawing Sheets

(56)        References Cited

FOREIGN PATENT DOCUMENTS

| JP | 2014525875 | A  | 10/2014 |
| JP | 2019503937 | A  | 2/2019 |
| KR | 20150016691 | A  | 2/2015 |
| KR | 20200126804 | A  | 11/2020 |
| WO | 2017089007 | A1 | 6/2017 |
| WO | 2020069872 | A1 | 4/2020 |

* cited by examiner

25

27

26

HYDRAULIC BLOCK FOR A HYDRAULIC VEHICLE POWER BRAKE SYSTEM

FIELD

The present invention relates to a hydraulic block for a hydraulic unit of a hydraulic vehicle power brake system. Hydraulic blocks of this type are used for mechanical fastening and hydraulic interconnection of hydraulic components for generating brake pressure with external power, and for regulating or controlling the brake pressure and/or slip control. The hydraulic block fitted with the hydraulic components forms the hydraulic unit.

BACKGROUND INFORMATION

German Patent Application No. DE 10 2017 214 593 A1 describes a hydraulic unit for a hydraulic vehicle power brake system with a cuboid hydraulic block comprising a power cylinder bore, in which a power piston is accommodated in an axially displaceable manner for generating a hydraulic brake pressure with external power. An electric motor with which the piston can be displaced in the power cylinder bore of the hydraulic block via a worm gear is fastened to the hydraulic block at a mouth of the power cylinder bore. Brake pressure can be produced and/or brake fluid can be conveyed by displacing the power piston in the power cylinder bore. The brake pressure and/or wheel brake pressures in hydraulic wheel brakes that are connected to the hydraulic block via brake lines can be regulated for slip control using solenoid valves disposed on or in the hydraulic block.

The power piston of the conventional hydraulic unit is not accommodated directly in the power cylinder bore. Instead a cylindrical tube-shaped bushing which is closed at one end is pressed into the power cylinder bore of the hydraulic block in which the power piston is accommodated in an axially displaceable manner. The bushing protrudes from the hydraulic block on one side; it projects, as it were, and thus extends a stroke of the power piston.

SUMMARY

A hydraulic block according to the present invention is provided for a hydraulic unit of a hydraulic vehicle power brake system, which in particular comprises a slip control system. A key component of hydraulic vehicle power brake systems that comprise a slip control system is a hydraulic unit with a hydraulic block to which hydraulic wheel brakes of the vehicle brake system are or can be connected via brake lines. For muscle power actuation, the hydraulic block can likewise be connected or connectable to a master brake cylinder via brake lines, or the hydraulic block comprises a master brake cylinder bore.

Slip control systems are in particular anti-lock braking systems, traction control systems and/or vehicle dynamics control systems, for which the abbreviations ABS, ASR and/or VDC are commonly used. The latter are also colloquially referred to as "anti-skid control systems". Slip control systems are conventional and will not be explained in more detail here. The hydraulic unit is used to generate brake pressure with external power and to regulate brake pressure.

The hydraulic block is used for mechanical fastening and hydraulic interconnection of hydraulic components of the vehicle brake system or the slip control system. Such hydraulic components include, among others, solenoid valves, check valves, hydraulic accumulators, damper chambers, pressure sensors and a power brake pressure generator.

The power brake pressure generator comprises a power cylinder bore in the hydraulic block in which a power piston is or can be disposed. The power piston is also often referred to as a plunger piston and the power cylinder bore as a plunger receptacle, plunger bore, plunger cylinder or the like. To generate pressure using external power, the power piston of the power brake pressure generator is electromechanically displaced in the power cylinder bore via a worm gear or another rotation/translation converter gear with the aid of the electric motor, which is attached on the outside of the hydraulic block, wherein a mechanical reduction gear, in particular a planetary gear, can be disposed between the electric motor and the worm gear.

The hydraulic components are fastened in receptacles in the hydraulic block, which are typically configured as cylindrical through-holes or blind holes, in part with diameter gradations. "Connected" means that the receptacles or the hydraulic components fastened in them are connected by lines in the hydraulic block in accordance with a hydraulic circuit diagram of the vehicle brake system or its slip control system. The lines are typically drilled into the hydraulic block. The power cylinder bore and, if applicable, the master brake cylinder bore can likewise be drilled or produced in a manner other than drilling.

The hydraulic block fitted with the hydraulic components of the vehicle brake system or its slip control system forms a hydraulic unit, wherein "fitted" means that the hydraulic components are fastened in the receptacles of the hydraulic block respectively provided for them.

The hydraulic block according to an example embodiment of the present invention is cuboid and preferably drilled in a Cartesian configuration; it is in particular made of metal. "Drilled in a Cartesian configuration" means that the receptacles for the hydraulic components and the lines connecting them are provided in the hydraulic block parallel and perpendicular to one another and to surfaces and edges of the hydraulic block. Individual inclined receptacles and/or lines are possible.

According to an example embodiment of the present invention, the power cylinder bore is provided in a side of the hydraulic block referred to here as the motor side. The motor side, or the side on which the power cylinder bore opens, is preferably a large side of the cuboid hydraulic block. The power cylinder bore comprises an anti-rotation guide for the power piston which secures the power piston displaceable in the power cylinder bore against rotation. The anti-rotation guide can, for example, comprise one or more anti-rotation ribs or anti-rotation grooves which extend parallel to the axis on or in which the power piston is braced against rotation. Helically extending anti-rotation ribs or anti-rotation grooves are possible too, for example.

To extend a stroke of the power piston, the hydraulic block according to the present invention comprises a projection at a mouth of the power cylinder bore into which the anti-rotation guide continues from the power cylinder bore.

The hydraulic block according to an example embodiment of the present invention preferably also comprises a projection on a side opposite to the mouth of the power cylinder bore into which the power cylinder bore extends, as a result of which it is longer than a dimension of the hydraulic block in the direction of the power cylinder bore.

A "projection" is understood here to mean an elevation, an overhang, a ledge or the like on the side comprising the mouth of the power cylinder bore and, if appropriate, on the opposite side of the hydraulic block. The basic shape of the hydraulic block is cuboid, the projections extend from the cuboid.

The projection or projections according to the present invention enable an extension of the power cylinder bore and the stroke of the power piston, which is advantageous or even necessary in particular if the mouth of the power cylinder bore is in one of two opposite large sides of the hydraulic block and the power cylinder bore extends in the direction of a short dimension of the hydraulic block.

Further developments and advantageous embodiments of the present invention are disclosed herein.

All features disclosed in the description and the figures can be implemented individually or in fundamentally any combination in embodiments of the present invention. Embodiments of the present invention which do not comprise all but only one or more features of an embodiment of the present invention are possible.

BRIEF DESCRIPTION OF THE DRAWINGS

The present invention is explained in more detail in the following with reference to an embodiment shown in the figures.

The figures are simplified illustrations to clarify and understand the present invention.

DETAILED DESCRIPTION OF THE DRAWINGS

Figure 1:
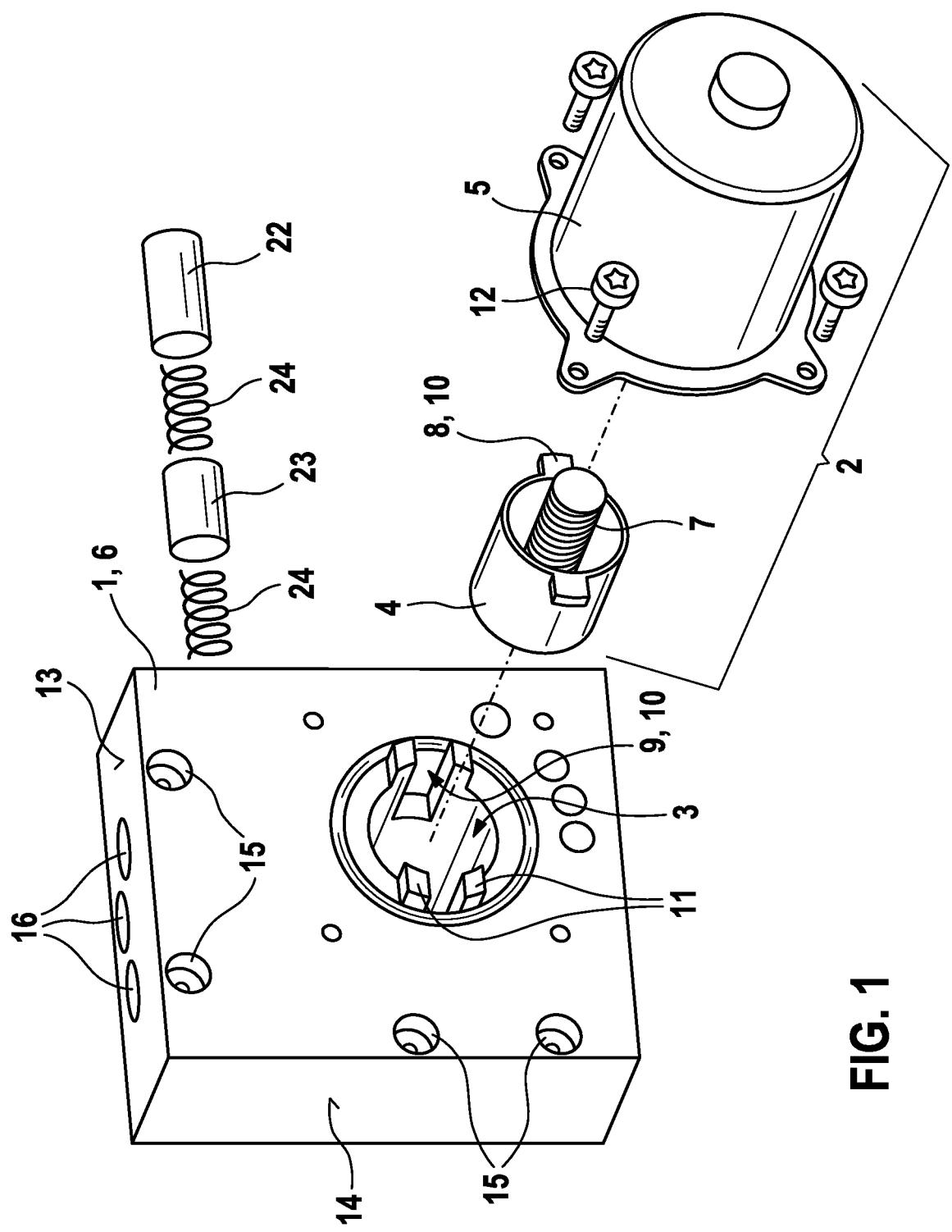
FIG. 1 shows a hydraulic block according to an example embodiment of the present invention in a perspective view looking at a motor side.
Figure 2:
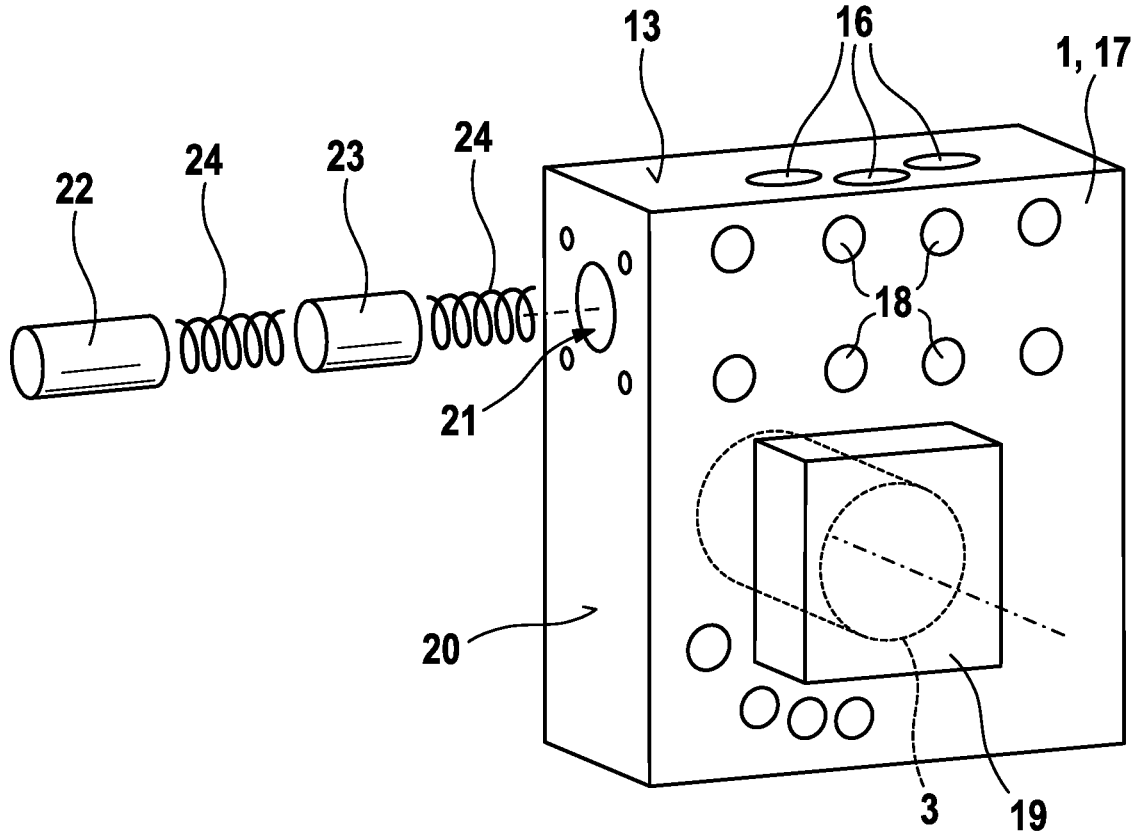
FIG. 2 shows the hydraulic block of FIG. 1 in a perspective view looking at an opposite valve side.

The hydraulic block 1 according to the present invention shown in FIGS. 1 and 2 is provided for a not depicted hydraulic unit in a likewise not depicted hydraulic vehicle power brake system comprising a slip control system. Slip control systems are in particular anti-lock braking systems, traction control systems and/or vehicle dynamics control systems, for which the abbreviations ABS, ASR and/or VDC are commonly used. Hydraulic vehicle power brake systems and slip control systems are well-known and will not be discussed here.

The hydraulic block 1 according to the present invention is a narrow, cuboid metal block, the opposite large sides of which are nearly square. "Narrow" means that a distance between the two large sides is not greater than half a length or width of the large sides. In the embodiment example, the distance of the two large sides from one another is approximately one quarter to one third of the length or width of the large sides of the hydraulic block 1. Other aspect ratios are possible.

The hydraulic block 1 is used for mechanical fastening and hydraulic interconnection of hydraulic components for generating brake pressure with external power and for regulating brake pressure during power braking and/or slip control. Such hydraulic components in particular include solenoid valves, check valves, hydraulic accumulators, hydraulic pumps and a power brake pressure generator 2. The hydraulic components are fastened in receptacles in the hydraulic block 1. The receptacles are cylindrical counterbores, blind holes and/or also through-holes, which can include diameter gradations and into which the hydraulic components are inserted and fastened in a pressure-tight manner, for example by means of circumferential caulking. The hydraulic components can be countersunk in the receptacles or project from the hydraulic block 1. The hydraulic block 1 fitted with the hydraulic components forms the not depicted hydraulic unit for generating power brake pressure and regulating the brake pressure of the hydraulic vehicle power brake system.

Hydraulic interconnection means that the receptacles for the hydraulic components are connected to one another by lines that pass through the hydraulic block 1 in accordance with a hydraulic circuit diagram of the vehicle power brake system or its slip control system. The receptacles and lines form a so-called "bore system" of the hydraulic block 1, wherein the receptacles and lines can in principle also be produced in a manner other than drilling.

The hydraulic block 1 according to the present invention comprises a power cylinder bore 3 which passes through the hydraulic block 1 perpendicular to the two opposite large sides of the hydraulic block 1. The power cylinder bore 3 can be drilled or produced in a manner other than drilling. The power cylinder bore 3 serves to displaceably accommodate a power piston 4 of the power brake pressure generator 2, which is often also referred to as a plunger piston.

An electric motor 5 for driving, i.e., displacing, the power piston 4 in the power cylinder bore 3 is attached coaxially to the power cylinder bore 3 on the outside of the large side of the hydraulic block 1 on which the power cylinder bore 3 opens and which is referred to here as the motor side 6 of the hydraulic block 1. The electric motor 5 displaces the power piston 4 via a reduction gear and a worm gear. In the embodiment example, the reduction gear is a planetary gear that is housed coaxially with the electric motor 5 and the power cylinder bore 3 in a motor housing of the electric motor 5 and is therefore not visible. In the embodiment example, the worm gear, which can also generally be understood as a rotation/translation converter gear, is a screw drive, namely a ball screw drive. It is disposed coaxially with the electric motor 5 and the power cylinder bore 3, partly inside the motor housing of the electric motor and partly inside the power piston 4.

In the embodiment example, the power piston 4 is a cylindrical tube-shaped hollow piston, the closed end of which faces a base of the power cylinder bore 3 and the open end of which faces the electric motor 5.

A spindle 7 of the ball screw drive is disposed coaxially in the power piston 5 and is rigidly connected to a piston floor of the power piston 5. A nut of the ball screw drive, which can be rotationally driven by the electric motor 5 via the planetary gear that is not visible in the figure, is likewise located in the motor housing of the electric motor 5 and is not visible in the figure.

The electric motor 5, the not visible reduction gear/planetary gear, the worm gear, of which only the spindle 7 can be seen in the drawing, the power piston 4 and the power cylinder bore 3 form the power brake pressure generator 2 for generating the hydraulic brake pressure for power braking.

On its open end which faces the electric motor 5, the power piston 4 comprises two radially outward projecting lugs 8 on opposite circumferential locations. The lugs 8 engage in anti-rotation grooves 9, which are attached axially parallel on opposite circumferential locations of the power cylinder bore 3 in the hydraulic block 1. The outward projecting lugs 8 of the power piston 4 and the anti-rotation grooves 9 in the power cylinder bore 3 of the hydraulic block 1 form an anti-rotation guide 10, which secures the power piston 4 in a rotationally fixed manner, i.e. prevents it from rotating along with the rotational driving of the planetary gear forming the reduction gear and the worm gear. The number of two lugs 8 and two anti-rotation grooves 9 and/or their opposite arrangement is not mandatory for the present invention. There can also be only one lug 8 and one anti-rotation groove 9 or more than two lugs 8 and more than two anti-rotation grooves 9 and/or the lugs 8 and the anti-rotation grooves 9 can be arranged other than opposite one another around the circumference of the power piston 4 and the power cylinder bore 3 (not shown). Anti-rotation elements other than the lugs 8 and the anti-rotation grooves 9 as an anti-rotation guide 10 for the power piston 4 are possible as well (not shown).

At the mouth of the power cylinder bore 3 in the motor side 6, the anti-rotation grooves 9 are open. On the circumference of the power cylinder bore 3, the hydraulic block 1 according to the present invention comprises a projection 11 into which the anti-rotation grooves 9 continue. In the embodiment example, the projection 11 is two respective pins with approximately parallelogram-shaped cross-sections, the inner surfaces of which are cylindrically hollow circular and continue a cylindrical inner circumferential surface of the power cylinder bore 3 in alignment without offset, interruption or other irregularity. Facing surfaces of the pins forming the projection 11 likewise extend groove cheeks of the anti-rotation grooves 9 in alignment without offset, interruption, or other irregularity. The pins forming the projection 11 extend both an axial guide and the anti-rotation guide 10 of the power piston 4 beyond the motor side 6 of the hydraulic block 1. The present invention is not limited to the drawn and described projection 11; other projections 11 for extending the anti-rotation guide 10 beyond the motor side 6 of the hydraulic block 1 are possible (not shown).

Threaded holes are provided in the motor side 6 of the hydraulic block 1 around the mouth of the power cylinder bore 3 for fastening the electric motor 6 with screws 12.

In addition, a total of four blind holes are provided on an upper side 13 and an adjacent narrow side 14 of the hydraulic block 1 as brake line connectors 15 in the motor side 6 of the hydraulic block 1. The brake line connectors 15 are used to connect not depicted brake lines, which lead to hydraulic wheel brakes of the vehicle brake system. The brake lines can be connected with screw nipples or press-in nipples using the so-called self-clinch technology (not shown), for example.

In the upper side 13, the hydraulic block 1 in the embodiment example comprises three blind holes as connectors 16 for a not depicted brake fluid reservoir, which is placed onto the upper side 13 of the hydraulic block 1 and comprises connecting nipples on its base, which, when the brake fluid reservoir is placed onto the upper side 13 of the hydraulic block 1, reach into the connectors 16 and, for example, comprise O-rings to seal them in the connectors 16.

In a large side opposite to the motor side 6, which is referred to here as the valve side 17, the hydraulic block 1 according to the present invention comprises blind holes as receptacles 18 for not depicted solenoid valves of the slip control system of the hydraulic vehicle power brake system. Such solenoid valves are inlet valves, outlet valves, separator valves and suction valves, for example. The not depicted solenoid valves are inserted into the receptacles 18 such that their hydraulic parts forming the actual valves are located in the receptacles 18 and are caulked there in a pressure-tight manner. Valve domes in which magnet armatures of the solenoid valves are located, project from the valve side 17 of the hydraulic block 1. Solenoid coils are placed on them (not shown).

On its valve side 17, the hydraulic block 1 comprises a projection 19 into which the power cylinder bore 3 extends, so that the power cylinder bore 3 is longer than a distance of the motor side 6 from the valve side 17. Generally speaking, the projection 19 causes the power cylinder bore 3 to be longer than a distance of the side of the hydraulic block 1 on which the power cylinder bore 3 opens from the side of the hydraulic block 1 opposite to it. The projection 19 is an elevation, a ledge or the like on the valve side 17 of the hydraulic block 1. The projection 19 can, for instance, be cylindrical, square as in the embodiment example, or have a different shape.

In a fastening side 20 of the hydraulic block 1 opposite to the narrow side 14 and adjoining the motor side 6, the valve side 17 and the upper side 13, a master brake cylinder bore 21 is provided (FIG. 2), which extends parallel to the upper side 13 and goes all the way or almost all the way through the hydraulic block 1. The master brake cylinder bore 21 is either embodied as a blind hole and thus closed on the narrow side 14 of the hydraulic block 1 or it is embodied as a through-hole and sealed in a pressure-tight manner on the narrow side 14 of the hydraulic block 1, for example with a plug.

The master brake cylinder bore 21 is provided for axially displaceable accommodation of two master brake cylinder pistons 22, 23 and two piston springs 24. One of the two master brake cylinder pistons 22 is a so-called primary or rod piston, which can be displaced in the master brake cylinder bore 21 with muscle power by means of a foot brake pedal or possibly also a hand brake lever via a piston rod, which connects the primary or rod piston 22 in an articulated manner to the foot brake pedal or the hand brake lever. The other master brake cylinder piston 23 is a so-called secondary or floating piston that is displaced in the master brake cylinder bore 21 by means of hydraulic pressure exerted by the primary or rod piston 22. The master brake cylinder bore 21 enables the hydraulic vehicle power brake system to be actuated by muscle power.

It is provided that the hydraulic block 1 equipped with the solenoid valves and other components of the brake pressure and slip control system and the power brake pressure generator 2, i.e. the hydraulic unit, is fastened with the fastening side 20 in an engine compartment to a bulkhead of a motor vehicle (not shown).

Figure 3:
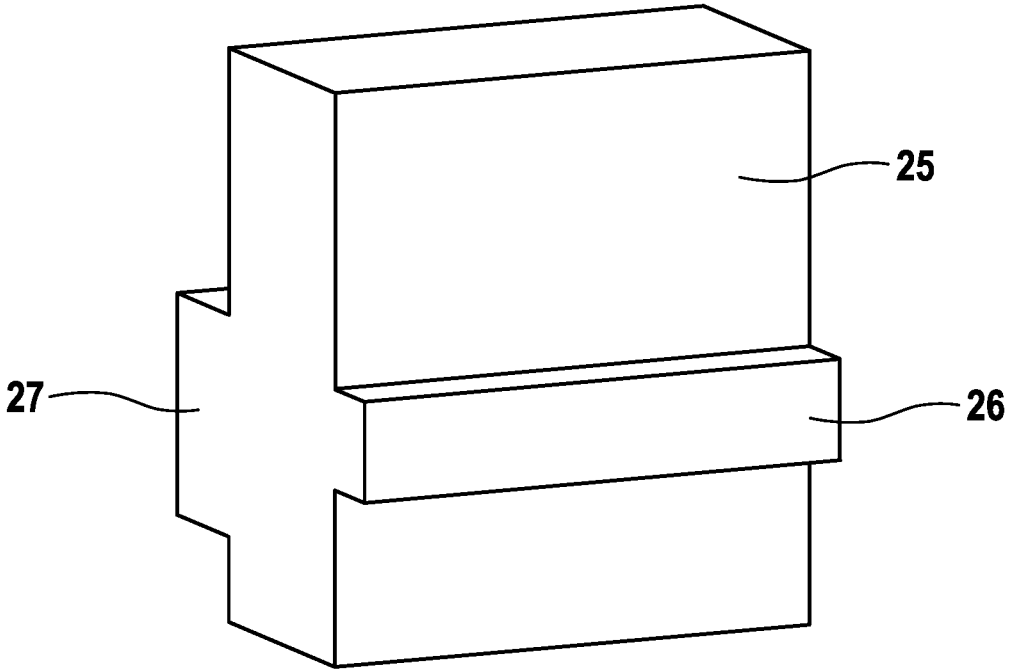
FIG. 3 shows a blank of the hydraulic block of FIGS. 1 and 2 in a perspective corresponding to FIG. 1.

FIG. 3 shows a blank 25 from which the hydraulic block 1 according to the present invention is produced, for example by machining such as milling and/or drilling. The blank 25 is a workpiece from which a finished part, here the hydraulic block 1, is produced by machining or further processing. The blank 25 in the embodiment example is produced by forming, specifically extrusion, from metal, in the embodiment example an aluminum alloy, as a profile bar, from which blanks 25 are separated by sawing or in some other way.

As can be seen in FIG. 3, the blank 25 of the hydraulic block 1 has the shape of a cuboid with a rod-shaped elevation 26 with a rectangular cross-section on a large side of the cuboid and a likewise rod-shaped elevation 27 with a rectangular cross-section on an opposite large side of the cuboid. One of the two elevations 27 is wider and higher than the other elevation 26, wherein the two elevations 26, 27 overlap one another when viewed perpendicular to the large sides of the cuboid. A cross-section of the blank 25 perpendicular to the elevations 26, 27 is constant over an entire extent of the blank 25 in a longitudinal direction of the elevations 26, 27. The projection 19 that extends the power cylinder bore 3 on the valve side 17 is produced from the larger elevation 27, and the pins that form the projection 11 on the motor side 6 of the hydraulic block 1 and extend the anti-rotation guide 10 are produced from the smaller elevation 26 by removing (in the embodiment example by machining) everything from the elevations 26, 27 that does not form the projections 11, 19.

Due to the production of the hydraulic block 1 from the blank with the two rod-shaped elevations 26, 27 with rectangular cross-sections on the large sides of the blank 25, the projections 11, 19 are integral components of the hydraulic block 1. Attaching one or both projections 11, 19 as originally separate parts by joining, for example in a material-locking manner, for example by welding, by forming, for example caulking, or for example also by screwing to the hydraulic block 1, is possible too, for instance.

The invention claimed is:

1. A cuboid hydraulic block for a hydraulic vehicle power brake system, comprising:
   a power cylinder bore in a motor side of the hydraulic block with an anti-rotation guide for a power piston which secures the power piston displaceable in the power cylinder bore against rotation; and
   a projection at a mouth of the power cylinder bore, the projection extending the anti-rotation guide beyond the motor side of the hydraulic block.

2. The hydraulic block according to claim 1, wherein, on a side of the hydraulic block opposite to the motor side, the hydraulic block includes a projection into which the power cylinder bore extends.

3. The hydraulic block according to claim 1, wherein the projection is an integral component of the hydraulic block.

4. The hydraulic block according to claim 1, wherein the projection is attached to the hydraulic block.

5. The hydraulic block according to claim 1, wherein the power cylinder bore extends in a direction of a smallest dimension of the hydraulic block.

6. The hydraulic block according to claim 1, further comprising:
   a master brake cylinder bore and/or receptacles for solenoid valves.

7. A blank for a hydraulic block, the blank being in a shape of a cuboid which includes a rod-shaped elevation with a constant cross-section on a motor side or includes rod-shaped elevations with constant cross-sections on the motor side and on a side of the blank opposite to motor side which overlap one another when viewed perpendicular to the motor side.

8. The blank according to claim 7, wherein the blank is produced by forming as a profile bar having a constant cross-section.

* * * * *